US006576722B2

(12) United States Patent
Coca et al.

(10) Patent No.: US 6,576,722 B2
(45) Date of Patent: Jun. 10, 2003

(54) ACRYLIC-HALOGENATED POLYOLEFIN COPOLYMER ADHESION PROMOTERS

(75) Inventors: Simion Coca, Pittsburgh, PA (US); Brian K. Rearick, Allison Park, PA (US); James B. O'Dwyer, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 91 days.

(21) Appl. No.: 09/736,507

(22) Filed: Dec. 13, 2000

(65) Prior Publication Data

US 2002/0143127 A1 Oct. 3, 2002

(51) Int. Cl.$^7$ ................................. C08J 4/44; C08J 4/00
(52) U.S. Cl. ..................... 526/111; 526/135; 526/145; 526/146; 526/147; 526/172; 525/168; 525/268; 525/269; 525/301; 525/312; 427/407.1
(58) Field of Search .................. 525/301, 268, 525/269, 312, 168; 526/172, 135, 145, 146, 147, 111; 427/407.1

(56) References Cited

U.S. PATENT DOCUMENTS

| | | |
|---|---|---|
| 4,755,563 A | 7/1988 | West |
| 4,812,517 A | 3/1989 | West |
| 5,085,698 A | 2/1992 | Ma et al. |
| 5,219,945 A | 6/1993 | Dicker et al. |
| 5,221,334 A | 6/1993 | Ma et al. |
| 5,292,201 A | 3/1994 | Yano |
| 5,478,886 A | 12/1995 | Kim |
| 5,789,487 A | 8/1998 | Matyjaszewski et al. |
| 5,807,937 A * | 9/1998 | Matyjaszewski et al. ... 526/135 |
| 5,955,545 A | 9/1999 | Marutani et al. |
| 5,984,015 A | 11/1999 | Vieregge |
| 6,162,882 A | 12/2000 | Matyjaszewski et al. |

FOREIGN PATENT DOCUMENTS

| | | | |
|---|---|---|---|
| WO | WO 97/18247 | 5/1997 | ............. C08F/4/40 |
| WO | WO 98/40415 | 9/1998 | ............. C08F/4/10 |

OTHER PUBLICATIONS

Paik, Hyun–jong, et al., "Synthesis and Characterization of Graft Copolymers of Poly(vinyl chloride) with Styrene and (Meth)Acrylates by Atom Transfer Radical Polymerization," *Macromol. Rapid Commun.*, 19, pp. 47–52 (1998).

* cited by examiner

*Primary Examiner*—Tatyana Zalukaeva

(57) ABSTRACT

The present invention is directed to a method for producing a copolymer and a copolymer product of the method. The copolymer is prepared by a controlled radical polymerization process, typically an atom transfer radical polymerization process, in which polymerizable alkene monomers are polymerized in the presence of a halogenated polyolefin macroinitiator. The copolymer product of this process is useful in a film-forming composition that adheres strongly to polyolefinic substrates and to which non-polyolefinic film-forming compositions strongly adhere. The copolymer can be applied to a substrate in an adhesion-promoting layer or can be incorporated into a film-forming composition, such as a primer, that contains additional resinous compounds.

27 Claims, No Drawings

ACRYLIC-HALOGENATED POLYOLEFIN COPOLYMER ADHESION PROMOTERS

FIELD OF THE INVENTION

The present invention relates to adhesion promoters that improve adhesion between film-forming coatings and adhesives and polyolefinic substrates. The adhesion promoters are prepared by controlled radical polymerization using a halogenated polyolefin as a macroinitiator.

BACKGROUND OF THE INVENTION

Polyolefins, such as polypropylene and polyethylene are used in a wide variety of molding applications including, for example, in preparation of molded parts for use in the automotive, industrial and appliance markets. The preparation of such molded articles generally includes the steps of molding an article from the polyolefin resin and applying to the molded article one or more film-forming coating layers to protect and/or color the article and/or an adhesive to attach the molded article to another article.

One difficulty with use of poyolefinic substrates is that typical film-forming coatings and adhesives do not adhere well to the substrate. In the case of a film-forming coating applied to the substrate, the layer delaminates. In the case of adhesives, adhesive failure is commonplace.

A solution to the failure of coatings and adhesives to adhere to the polyolefinic substrate is to include a layer of a film-forming composition including a chlorinated polyolefin (CPO) between the substrate and the film-forming coating or adhesive. This adds a processing step and, since chlorinated polyolefins are relatively expensive, adding to the cost of using polyolefins to produce molded parts.

U.S. Pat. No. 5,955,545 discloses use of CPO-acrylic graft copolymers as adhesion promoters that assertedly improve adhesion of subsequent coating layers and/or adhesives to polyolefins. However, these graft copolymer adhesion promoters are prepared by standard free radical polymerization methods and suffer from high polydispersity and the presence of non-graft polymer chains and acrylic copolymers and homopolymers in the resin composition as a result of the random nature of standard radical polymerization processes. The high polydispersity and additional non-graft chains present in the same mixture as the graft polymer results in incomplete or inefficient adhesion promotion and interference with the curing dynamics of the resin. Further, these compositions are unstable, readily falling out of solution, especially when incorporated in a film-forming composition, and they absorb and scatter light, giving a hazy appearance. Thus, they are unsuitable for many coating applications.

It is, therefore, desirable to have well defined adhesion promoting material that includes polyolefinic segments or portions that interact strongly with polyolefinic substrates as well as portions or non-polyolefinic segments that interact well with film-forming resins, crosslinkers and/or curing agents and solvents that are present in a typical coating composition. It is also desirable that the adhesion promoter be of a more defined architecture than is typically found in graft copolymers formed by a free radical process. The defined architecture will allow for design of copolymers that interact with other components of the coating composition in a consistent manner with less contamination with undesirable polymer species that typically result from free radical grafting to CPOs. The low polydispersity of the material, combined with the substantial absence of undesirable polymer species would yield a clear, stable coating additive or coating composition that would adhere well to polyolefinic substrates.

A wide variety of radically polymerizable monomers, such as methacrylate and acrylate monomers, are commercially available and can provide a wide range of properties including, for example, hydrophilic and hydrophobic properties, the ability to interact with crosslinkers, or to self crosslink.

U.S. Pat. Nos. 5,807,937; 5,789,487; and 5,763,548 and International Patent Publication Nos. WO 98/40415; WO 98/01480; WO 97/18247; and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

U.S. Pat. Nos. 5,478,886; 5,272,201; 5,221,334; 5,219,945; 5,085,698; 4,812,517; and 4,755,563 describe ABC, AB and BAB block copolymers and pigmented ink compositions containing such block copolymers. The block copolymers of the '886, '201, '334, '945, '698, '517 and '563 patents are described as being prepared by living or stepwise polymerization processes, such as anionic or group transfer polymerization.

A number of initiators and macroinitiators are known to support ATRP polymerization. These initiators are described, for example, in U.S. Pat. Nos. 5,807,937 and 5,986,015. U.S. Pat. No. 5,807,937 discloses a number of initiators, including a macroinitiator, where halide groups attached to an activated benzylic carbon serve as the initiating site. The '937 patent discloses that benzyl halides can be efficient initiators for ATRP in monomeric form as well as in a polymer.

WO 9840415 A1 discloses ATRP macroinitiators having an activated halogen, which have been prepared by chlorosulfonation of polyethylene. The chlorosulfonyl group is known to be a good ATRP initiator in monomeric form.

Paik et al. ("Synthesis and Characterization of Graft Copolymers of Poly (vinyl chloride) with Styrene and (Meth) acrylates by Atom Transfer Polymerization", Macromol. Rapid Commun., 19, 47–52(1998)) disclose that polyvinyl chloride is incapable of serving as an initiator in an ATRP process. Paik further discloses that ATRP can be initiated by the activated chlorine in a chloroacetate group attached to a PVC backbone. Paik also discloses that the secondary chlorines on the PVC backbone do not initiate ATRP. Collectively, the prior art indicates that effective ATRP macroinitiators should contain activated halogens.

SUMMARY OF THE INVENTION

In accordance with the present invention, an alkenyl (co)polymer is provided that is prepared by polymerizing alkenyl monomers in the presence of an initiator or macroinitiator (collectively "an initiator") having halide groups attached to tertiary carbons under atom transfer radical polymerization conditions. An example of such an initiator is, without limitation, a halogenated polyolefin such as a chlorinated or brominated polypropylene, polybutylene or branched polyethylene. This polymer finds use in a variety of applications, such as, without limitation, in compositions for coating, molding and extruding. A typical use for the copolymer is as an additive to a film-forming resin composition for coating a polyolefinic substrate. The additive both promotes interlayer adhesion between the coating composition layer and the polyolefinic substrate and can be crosslinked into the film-forming resin.

A curable film-forming composition including the alkenyl-halogenated polyolefin copolymer is also provided. The halogen content of the halogenated polyolefin embodiment is typically either chlorine or bromine. The number of halide groups in the initiator can vary, but typically falls between about 15% to 45% by weight of the initiator, as is commonly found in commercially available halogenated polyolefins.

A method of coating a polyolefinic substrate also is provided that includes applying to the polyolefinic substrate a film-forming composition comprising the above-described vinyl-halogenated polyolefin copolymer. A coated article prepared according to the method is also described.

DETAILED DESCRIPTION OF THE PREFERRED EMBODIMENTS

Other than in the operating examples, or where otherwise indicated, all numbers or expressions referring to quantities of ingredients, reaction conditions, etc, used in the specification and claims are to be understood as modified in all instances by the term "about". As used herein, the term "polymer", and the like, is intended to include both polymers and oligomers unless stated otherwise. The term "copolymer" is intended to include both random or block copolymers unless specified otherwise.

As described above, the present invention is a polymeric composition prepared by an ATRP process. The process utilizes a novel ATRP initiator that expands the type of copolymers that can be prepared by the ATRP process and the uses therefor. The initiator is a halogenated polyolefin, resulting in the production of a graft copolymer useful as an additive in a coating composition for polyolefinic substrates, among other uses. By the term "polyolefinic substrate" it is meant as a substrate having, on at least a portion of its surface, a polyolefinic composition.

The copolymer of the present invention is prepared by controlled radical polymerization. As used herein and in the claims, the term "controlled radical polymerization", and related terms, e.g., "living radical polymerization", refer to those methods of radical polymerization that provide control over the molecular weight, polymer chain architecture and polydispersity of the resulting polymer. A controlled or living radical polymerization is also described as a chain-growth polymerization that propagates with essentially no chain transfer and essentially no chain termination. The number of living polymer chains formed during a controlled radical polymerization is often nearly equal to the number of initiators present at the beginning of the reaction. Each living polymer chain typically contains a residue of the initiator at what is commonly referred to as its tail and a residue of the radically transferable group at what is commonly referred to as its head.

In an embodiment of the present invention, the copolymer is prepared by atom transfer radical polymerization (ATRP). The typical ATRP process can be described generally as including the steps of polymerizing one or more radically polymerizable monomers in the presence of an initiation system; forming a polymer; and isolating the formed polymer. In the present invention, the initiation system comprises a halogenated polyolefinic initiator; a transition metal compound, i.e., a catalyst, which participates in a reversible redox cycle with the initiator; and a ligand, which coordinates with the transition metal compound. The ATRP process is described in further detail in International Patent Publication WO 98/40415 and U.S. Pat. Nos. 5,807,937; 5,763,548 and 5,789,487.

In the present invention, ATRP is performed using a polymer which has not been modified to introduce a known activated halogen group or has it been modified as the result of copolymerization of a monomer containing a known activated halogen group. Thus, in the present invention, an unmodified halogen containing polymer is the site for ATRP initiation. Post polymerization modification or inclusion of a special ATRP initiating monomer are not required. This avoids additional process steps in the first case and avoids making a special copolymer in the second.

There are a number of potential explanations as to the exact chemical reason for ATRP functioning well in an unmodified halogen containing polymer, without the presence of the prior art activated halogens. Without wishing to be bound to any single theory, it is believed that the inductive effect of other halogens on the main polymer chain in proximity to the initiating halogen is responsible for its ability to initiate ATRP. Given the free radical nature of ATRP, it is believed that the tertiary halogens on the polymer are the most prone to act as ATRP initiation sites.

Catalysts that may be used in the ATRP preparation of the copolymer of the present invention include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula (I), $$TM^{n+}X_n \qquad (I)$$

wherein TM is the transition metal, n is the formal charge on the transition metal having a value of from 0 to 7, and X is a counterion or a covalently bonded component. Examples of the transition metal (TM) include, but are not limited to, copper, iron, gold, silver, mercury, palladium, platinum, cobalt, manganese, ruthenium, molybdenum, niobium and zinc. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., one mole percent, of a redox conjugate, for example, Cu(II)Cl$_2$ when Cu(I)Cl is used. Additional catalysts useful in preparing the polymer are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the copolymer include, but are not limited to, compounds having one or more carbon, nitrogen, oxygen, phosphorus and/or sulfur atoms, which can coordinate to the transition metal catalyst compound, e.g., through sigma and/or pi bonds. Classes of useful ligands include, but are not limited to, unsubstituted and substituted pyridines and bipyridines; porphyrins; cryptands; crown ethers, e.g., 18-crown-6; polyamines, e.g., ethylenediamine; glycols, e.g., alkylene glycols, such as ethylene glycol and carbon monoxide. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing the polymer are described in U.S. Pat. No. 5,807,937 at column 18, line 57 through column 21, line 43.

The present invention utilizes novel macroinitiators that are typically halogenated polyolefins. The initiator includes one or more ATRP initiation sites that is a halide group attached to a tertiary carbon (hereinafter "tertiary halide"). A halide group that is capable of serving as an ATRP initiation site, whether or not a tertiary, secondary or primary halide, or otherwise, is hereinafter referred to as a "dormant halide", as opposed to a halide that is not capable of serving efficiently as a site of ATRP initiation.

Suitable macroinitiators include, without limitation, halogenated polyolefins such as polypropylene and polybutylene. The halide group is typically chlorine and/or bromine. The macroinitiator also can be a branched polyethylene containing a suitable number of tertiary halides.

As used herein and in the claims, by "olefin" and like terms it is meant unsaturated aliphatic hydrocarbons having one or more double bonds, such as obtained by cracking petroleum fractions. Specific examples of olefins include, but are not limited to, propylene, 1-butene, 1,3-butadiene, isobutylene and diisobutylene. A "polyolefin" is a polymer formed from olefins. Common examples are polypropylene and polybutylene and include the class of thermoplastic polyolefins (TPOs). The polyolefin may be homopolymeric or copolymeric. A variety of homopolymeric halogenated polyolefins are available from Eastman Chemical Company, among others. A halogenated polyolefin is a halogen-substituted polyolefin, and is typically chlorinated or brominated.

There is no literal limit as to the density of halides on the polyolefin backbone of the initiator. However, the halogenated polyolefin typically is a chlorinated or brominated polyolefin having 15% to 45% by weight halide groups, with at least about 80% of the halides being attached to tertiary carbons and, therefore, being dormant halides. Halogenated polyolefins having 15% to 45% by weight halide groups represent most commercially available halogenated polyolefins. However, when halogenated polyolefins having 15% to 45% by weight, halide groups are used as ATRP initiators, the resultant ATRP-produced copolymers are preferred as adhesion promoters for coating compositions used to coat polyolefinic substrates. Having a higher density of halide groups on the polyolefinic backbone of the initiator typically results in insufficient adhesion of copolymer-containing coating to the polyolefinic substrate. Too little halogenation of the polyolefinic backbone of the macroinitiator may result in poor compatibility of the copolymer with the coating composition in which it is dispersed and lack of other desirable functionality in the copolymer, such as sufficient crosslinking density. The most preferred halide group density on the polyolefin initiator will depend upon the ultimate end use for the ATRP-produced copolymer and, therefore, will vary from use-to-use.

Monomers that may be polymerized by the ATRP process of the present invention include all alpha, beta ethylenically unsaturated monomers that are known to be capable of polymerization by the ATRP process. Any radically polymerizable alkene containing a polar group can serve as a monomer for polymerization. The preferred monomers include those of the formula (II):

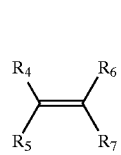

(II)

wherein $R_4$ and $R_5$ are independently selected from the group consisting of H, halogen, CN, $CF_3$, straight or branched alkyl of 1 to 20 carbon atoms (preferably from 1 to 6 carbon atoms, more preferably from 1 to 4 carbon atoms), aryl, $\alpha,\beta$-unsaturated straight or branched alkenyl or alkynyl of 2 to 10 carbon atoms (preferably from 2 to 6 carbon atoms, more preferably from 2 to 4 carbon atoms), $\alpha,\beta$-unsaturated straight or branched alkenyl of 2 to 6 carbon atoms (preferably vinyl) substituted (preferably at the $\alpha$-position) with a halogen (preferably chlorine), $C_3-C_8$ cycloalkyl, heterocyclyl, phenyl which may optionally have from 1–5 substituents on the phenyl ring, C(=Y)$R_8$, C(=Y) $NR_9 R_{10}$, YCR$_9 R_{10} R_{11}$ and YC(=Y)$R_{11}$, where Y may be $NR_{11}$ or O (preferably O), $R_8$ is alkyl of from 1 to 20 carbon atoms, alkoxy of from 1 to 20 carbon atoms, aryloxy or heterocyclyloxy, $R_9$ and $R_{10}$ are independently H or alkyl of from 1 to 20 carbon atoms, or $R_9$ and $R_{10}$ may be joined together to form an alkylene group of from 2 to 5 carbon atoms, thus forming a 3- to 6-membered ring, and $R_{11}$ is H, straight or branched $C_1-C_{20}$, alkyl and aryl; and $R_6$ is selected from the group consisting of H, halogen (preferably fluorine or chlorine), $C_1-C_6$ (preferably $C_1$) alkyl, CN, COOR$_{12}$ (where $R_{12}$ is H, an alkali metal, or a $C_1-C_6$ alkyl group) or aryl; or $R_4$ and $R_6$ may be joined to form a group of the formula $(CH_2)_{n'}$ (which may be substituted with from 1 to 2n' halogen atoms or $C_1-C_4$ alkyl groups) or C(=O)—Y—C (=O), where n' is from 2 to 6 (preferably 3 or 4) and Y is as defined above; or $R_7$ is the same as $R_4$ or $R_5$ or optionally $R_7$ is a CN group; at least two of $R_4$, $R_5$, and $R_6$ are H or halogen.

In the context of the present application, the terms "alkyl", "alkenyl" and "alkynyl" refer to straight-chain or branched groups.

Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and, more preferably, methyl), alkyl of from 1 to 20 carbon atoms (preferably from 1 to 6 carbon atoms and, more preferably, methyl) in which each of the hydrogen atoms is independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, $C_3-C_8$ cycloalkyl, phenyl, halogen, $NH_2$, $C_1-C_6$-alkylamino, $C_1-C_6$-dialkylamino, and phenyl which may be substituted with from 1 to 5 halogen atoms and/or $C_1-C_4$ alkyl groups. (This definition of "aryl" also applies to the aryl groups in "aryloxy" and "aralkyl".) Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocyclyls to be used as a monomer in the present invention include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocyclyls mentioned above may bear one or more (preferably 1 or 2) $C_1$–$C_6$ alkyl or alkoxy groups, cyano groups, ester groups or halogen atoms, either on the vinyl group or the heterocyclyl group, but preferably on the heterocyclyl group. Further, those vinyl heterocyclyls which, when unsubstituted, contain an N—H group may be protected at that position with a conventional blocking or protecting group, such as a $C_1$–$C_6$ alkyl group, a tris-$C_1$–$C_6$ alkylsilyl group, an acyl group of the formula $R_{13}$ CO (where $R_{13}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. (This definition of "heterocyclyl" also applies to the heterocyclyl groups in "heterocyclyloxy" and "heterocyclic ring".)

More specifically, preferred monomers include (but are not limited to) styrene, p-chloromethylstyrene, vinyl chloroacetate, acrylate and methacrylate esters of $C_1$–$C_{20}$ alcohols, isobutene, 2-(2-bromopropionoxy) ethyl acrylate, acrylonitrile, and methacrylonitrile.

The monomer containing at least one polar group may be present in an amount of 5 to 100 wt % by weight based on the total amount of monomers. A preferred amount of the monomer containing at least one polar group is 10 to 100 wt %; the most preferred amount is 20 to 100 wt % based on the total amount of monomers. This is particularly important in the case of acrylonitrile because an amount of at least 20 wt % assures solvent resistance properties of the resulting polymer A.

Examples of suitable monomers may each be independently selected from vinyl monomers, allylic monomers, olefins, (meth)acrylic acid, (meth)acrylates, (meth)acrylamide, N- and N,N-disubstituted (meth)acrylamides, vinyl aromatic monomers, vinyl halides, vinyl esters of carboxylic acids and mixtures thereof. More specific examples of suitable monomers include, without limitation, $C_1$–$C_{20}$ alkyl (meth)acrylates (including linear or branched alkyls and cycloalkyls) which include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth)acrylate; (meth)acrylate esters of $C_1$–$C_{20}$ alcohols; oxirane functional (meth)acrylates which include, but are not limited to, glycidyl (meth)acrylate, 3,4-epoxycyclohexylmethyl (meth)acrylate, and 2-(3,4-epoxycyclohexyl) ethyl(meth)acrylate; hydroxy alkyl (meth)acrylates having from 2 to 4 carbon atoms in the alkyl group which include, but are not limited to, hydroxyethyl (meth)acrylate, hydroxypropyl (meth)acrylate and hydroxybutyl (meth)acrylate. The residues may each independently be residues of monomers having more than one (meth)acryloyl group, such as (meth) acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers that may be used to prepare the polymer include, but are not limited to, styrene, p-chloromethyl styrene, divinyl benzene, vinyl naphthalene and divinyl naphthalene. Vinyl halides that may be used to prepare the graft copolymer include, but are not limited to, vinyl chloride and vinylidene fluoride. Vinyl esters of carboxylic acids that may be used to prepare the graft copolymer include, but are not limited to, vinyl acetate, vinyl butyrate, vinyl 3,4-dimethoxybenzoate and vinyl benzoate.

As used herein and in the claims, by the term "allylic monomer(s)" it is meant monomers containing substituted and/or unsubstituted allylic functionality, i.e., one or more radicals represented by the following general formula III,

$$H_2C=C(R_1)—CH_2— \quad (III)$$

wherein $R_1$ is hydrogen, halogen or a $C_1$ to $C_4$ alkyl group. Most commonly, $R_1$ is hydrogen or methyl and consequently general formula III represents the unsubstituted (meth)allyl radical. Examples of allylic monomers may each independently be residues that include, but are not limited to, (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the copolymer include, but are not limited to, cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the monomer includes a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)

acrylates, e.g., 2-naphthyl (meth)acrylate; vinyl esters of carboxylic acids, e.g., hexanoic acid vinyl ester and decanoic acid vinyl ester; N,N-di($C_1$-$C_8$ alkyl) (meth) acrylamides; maleimide; N-($C_1$-$C_{20}$ alkyl) maleimides; N-($C_3$-$C_8$ cycloalkyl) maleimides; N-(aryl) maleimides; and mixtures thereof. Examples of N-substituted maleimides include, but are not limited to, N-($C_1$-$C_{20}$ linear or branched alkyl) maleimides, e.g., N-methyl maleimide, N-tertiary-butyl maleimide, N-octyl maleimide and N-icosane maleimide; N-($C_3$-$C_8$ cycloalkyl) maleimides, e.g., N-cyclohexyl maleimide; and N-(aryl) maleimides, e.g., N-phenyl maleimide, N-($C_1$-$C_9$ linear or branched alkyl substituted phenyl) maleimide, N-benzyl maleimide and N-($C_1$-$C_9$ linear or branched alkyl substituted benzyl) maleimide.

The oxirane functional monomer or its residue that is reacted with a carboxylic acid, may be selected from, for example, glycidyl (meth)acrylate, 3,4-epoxycyclohexylmethyl(meth)acrylate, 2-(3,4-epoxycyclohexyl) ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

Other useful monomers include vinyl chloroacetate, isobutene, 2-(2-bromopropionoxy) ethyl acrylate and (meth) acrylonitrile.

In the ATRP preparation of the copolymer, the amounts and relative proportions of the initiator, the transition metal compound and the ligand are those for which ATRP is most effectively performed. The amount of initiator used can vary widely and is typically present in the reaction medium in a concentration of from $10^{-4}$ moles/liter (M) to 3M, for example, from $10^{-3}$M to $10^{-1}$M. As the molecular weight of the copolymer product can be directly related to the relative concentrations of initiator and monomer(s), the molar ratio of initiator to monomer is an important factor in copolymer preparation. The molar ratio of initiator to monomer is typically within the range of $10^{-4}$:1 to 0.5:1, for example, $10^{-3}$:1 to $5 \times 10^{-2}$:1.

In preparing the copolymer by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The copolymer may be prepared in the absence of solvent, i.e., by means of a bulk polymerization process. Generally, the copolymer is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$-$C_4$ alkanes and fluorocarbons, may also be employed. A preferred class of solvents are the aromatic hydrocarbon solvents, particularly preferred examples of which are xylene, toluene and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the copolymer is typically conducted at a reaction temperature within the range of 25° C. to 140° C., e.g., from 50° C. to 100° C., and a pressure within the range of 1 to 100 atmospheres, usually at ambient pressure. The ATRP is typically completed in less than 24 hours, e.g., between 1 and 8 hours.

The ATRP transition metal catalyst and its associated ligand are typically separated or removed from the copolymer product prior to its use, for instance, as an adhesion-promoting additive. Removal of the ATRP catalyst may be achieved using known methods, including, for example, adding a catalyst binding agent to the mixture of the copolymer, solvent and catalyst, followed by filtering. Examples of suitable catalyst binding agents include, for example, alumina, silica, clay or a combination thereof. A mixture of the copolymer, solvent and ATRP catalyst may be passed through a bed of catalyst binding agents. Alternatively, the ATRP catalyst may be oxidized in situ, the oxidized residue of the catalyst being retained in the polymer.

The copolymer can be a block copolymer having one or more segments. In a two-segment copolymer, the copolymer may have the general formula IV:

$$\phi\text{-}(A_p\text{-}B_s\text{-}X)_t \qquad (IV)$$

where each of A and B in general formula IV may represent one or more types of monomer residues, while p and s represent the average total number of A and B residues occurring per block or segment of A residues (A-block or A-segment) and B residues (B-block or B-segment), respectively, and t refers to the number of initiator sites present on the initiator, $\phi$. When containing more than one type or species of monomer residue, the A- and B-blocks may each have at least one of random block, e.g., di-block and tri-block, alternating and gradient architectures. Gradient architecture refers to a sequence of different monomer residues that change gradually in a systematic and predictable manner along the polymer backbone. For purposes of illustration, an A-block containing 6 residues of methyl methacrylate (MMA) and 6 residues of ethyl methacrylate (EMA), for which p is 12, may have di-block, tetra-block, alternating and gradient architectures as represented in general formulas V, VI, VII and VIII.

Di-Block Architecture

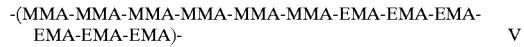

-(MMA-MMA-MMA-MMA-MMA-MMA-EMA-EMA-EMA-EMA-EMA-EMA)-      V

Tetra-Block Architecture

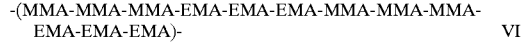

-(MMA-MMA-MMA-EMA-EMA-EMA-MMA-MMA-MMA-EMA-EMA-EMA)-      VI

Alternating Architecture

-(MMA-EMA-MMA-EMA-MMA-EMA-MMA-EMA-MMA-EMA-MMA-EMA)-      VII

Gradient Architecture

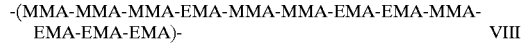

-(MMA-MMA-MMA-EMA-MMA-MMA-EMA-EMA-MMA-EMA-EMA-EMA)-      VIII

The B-block may be described in a manner similar to that of the A-block.

The order in which monomer residues occur along the polymer backbone of the copolymer is typically determined by the order in which the corresponding monomers are fed into the vessel in which the controlled radical polymerization is conducted. For example, in reference to general formula IV, the monomers that are incorporated as residues in the A-block of the copolymer are generally fed into the reaction vessel prior to those monomers that are incorporated as residues in the B-block.

During formation of the A- and B-blocks, if more than one monomer is fed into the reaction vessel at a time, the relative reactivities of the monomers typically determine the order in which they are incorporated into the living polymer chain. Gradient sequences of monomer residues within the A- and B-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts p and s represent average numbers of residues occurring in the respective A- and B-blocks. Typically, subscript s has a value of at least 1, and preferably at least 5 for general formula IV. Also, subscript s has a value of typically less than 300, preferably less than 100, and more preferably less than 50, e.g., 20 or less, for general formula IV. The value of subscript s may range between any combination of these values, inclusive of the recited values, e.g., s may be a number from 1 to 100. Subscript p may be 0, or may have a value of at least 1, and preferably at least 5. Subscript p also typically has a value of less than 300, preferably less than 100, and more preferably less than 50, e.g., 20 or less. The value of subscript p may range between any combination of these values, inclusive of the recited values, e.g., p may be a number from 0 to 50.

The copolymer can have any suitable number average molecular weight (Mn). Suitable number average molecular weights can be from 5,000 to 50,000, preferably from 12,000 to 40,000 most preferably from 17,000 to 30,000, as determined by gel permeation chromatography using polystyrene standards. The polydispersity index, i.e., weight average molecular weight (Mw) divided by Mn, of the graft portion of the copolymer is typically less than 2.0, e.g., less than 1.8 or less than 1.5.

Symbol $\phi$ of general formula I is, or is derived from, the residue of the initiator used in the preparation of the copolymer by controlled radical polymerization, and is free of the radically transferable group (dormant halide) of the initiator.

The symbol $\phi$ may also represent a derivative of the residue of the initiator. For example, if the initiators have oxyranyl group-containing moieties grafted thereto, the oxyranyl groups may be reacted either prior to or after the completion of the controlled radical polymerization with a carboxylic acid group-containing material. Classes of carboxylic acid group-containing materials with which oxyranyl functional initiators or their residues may be reacted include, for example, aromatic carboxylic acids, polycyclic aromatic carboxylic acids, aliphatic carboxylic acids having from 6 to 20 carbon atoms, and mixtures thereof. Specific examples of carboxylic acid group-containing materials with which oxyranyl functional initiators or their residues may be reacted may include, but are not limited to, para-nitrobenzoic acid, hexanoic acid, 2-ethyl hexanoic acid, decanoic acid, undecanoic acid and mixtures thereof.

In another embodiment of the present invention, a segment of the copolymer, i.e., the —(A)$_p$— segment in general formula IV can serve as a linking segment between the hydrophobic residue of the initiator, i.e., $\phi$- in general formula IV, and a hydrophilic segment, i.e., the —(B)$_s$— segment in general formula IV. In reference to general formula IV, A may be a residue of $C_1$–$C_4$ alkyl (meth) acrylates. Examples of $C_1$–$C_4$ alkyl (meth)acrylates of which A may be a residue include, methyl (meth)acrylate, ethyl (meth)acrylate, propyl (meth)acrylate, isopropyl (meth)acrylate, n-butyl (meth)acrylate, isobutyl (meth) acrylate, tert-butyl (meth)acrylate and mixtures thereof.

Hydrophilic segments, i.e., —(B)$_s$— in reference to general formula IV, may have nonionic moieties, ionic moieties and combinations thereof. The segment can comprise residues of a monomer selected from, for example, poly (alkylene glycol) (meth)acrylates; $C_1$–$C_4$ alkoxy poly (alkylene glycol) (meth)acrylates; hydroxyalkyl (meth) acrylates having from 2 to 4 carbon atoms in the alkyl group; N-(hydroxy $C_1$–$C_4$ alkyl) (meth)acrylamides (e.g., N-hydroxymethyl (meth)acrylamide and N-(2-hydroxyethyl) (meth)acrylamide); N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Hydrophilic segments including poly(alkylene glycol) (meth)acrylates and $C_1$–$C_4$ alkoxy poly(alkylene glycol) (meth)acrylates may be prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth) acrylate may be transesterified with a $C_1$–$C_4$ alkoxy poly (alkylene glycol), e.g., methoxy poly(ethylene glycol). Examples of preferred poly(alkylene glycol) (meth)acrylates and $C_1$–$C_4$ alkoxy poly(alkylene glycol) (meth)acrylates include, poly(ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc.

A segment of the copolymer may include carboxylic acid functional monomers which include, but are not limited to, (meth)acrylic acid, maleic acid, fumaric acid and undecylenic acid. For instance, in general formula IV, B may initially be a residue of a precursor of a carboxylic acid functional monomer that is converted to a carboxylic acid residue after completion of the controlled radical polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth) acrylates, such as t-butyl methacrylate, can be converted to (meth)acrylic acid residues by art-recognized ester hydrolyzation methods, which typically involve the concurrent removal of an alcohol, such as t-butanol by vacuum distillation. Salts of carboxylic acid functional monomers include, for example, salts of (meth)acrylic acid and primary, secondary or tertiary amines, such as, butyl amine, dimethyl amine and triethyl amine.

The copolymer may contain a segment that contains amine functional monomers which include, for example, amino($C_2$–$C_4$ alkyl) (meth)acrylates, e.g., 2-aminoethyl (meth)acrylate, 3-aminopropyl (meth)acrylate and 4-aminobutyl (meth)acrylate; N-($C_1$–$C_4$ alkyl)amino($C_2$–$C_4$ alkyl) (meth)acrylates, e.g., N-methyl-2-aminoethyl (meth) acrylate; and N,N-di($C_1$–$C_4$ alkyl)amino($C_2$–$C_4$ alkyl) (meth)acrylates, e.g., N,N-dimethyl-2-aminoethyl (meth)

acrylate. A segment may also comprise residues of salts of amine functional monomers, e.g., salts of those amine functional monomers as recited previously herein. Salts of the amine functional monomer residues may be formed by mixing a carboxylic acid, e.g., lactic acid, with the copolymer after completion of controlled radical polymerization.

In one embodiment of the copolymer, a segment contains carboxylic acid functional monomers selected from (meth) acrylic acid, maleic anhydride, maleic acid, di($C_1$–$C_4$ alkyl) maleates, and mixtures thereof. In a still further embodiment of the present invention, amine functional monomers are selected from amino($C_2$–$C_4$ alkyl) (meth)acrylates, N-($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

A segment of the copolymer may also contain cationic moieties selected from ammonium, sulphonium and phosphonium. Ammonium, sulphonium and phosphonium moieties may be introduced into the graft copolymer by means known to the skilled artisan. For example, when a segment contains N,N-dimethyl-2-aminoethyl (meth)acrylate monomers, the N,N-dimethylamino moieties may be converted to ammonium moieties by mixing an acid, e.g., lactic acid, with the graft copolymer.

When a segment of the copolymer contains residues of oxirane functional monomers, such as glycidyl (meth) acrylate, the oxirane groups may be used to introduce sulphonium or phosphonium moieties into the copolymer. Sulphonium moieties may be introduced into the copolymer by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the copolymer.

Other reactive groups, such as carbamate groups, can be incorporated into the copolymer. Carbamate groups, may be introduced by including in the ATRP reaction mixture monomers that include carbamate groups and/or by post-reacting the copolymer to add a carbamate group. For instance, carbamate functional groups can be incorporated into the copolymer by reacting a hydroxyl functional acrylic moiety with a low molecular weight alkyl carbamate such as methyl carbamate. Hydroxyl functional acrylic moieties also can be reacted with isocyanic acid to provide pendant carbamate groups. Likewise, hydroxyl functional copolymers can be reacted with urea to provide pendant carbamate groups.

In a preferred embodiment of the present invention, the radically transferable group is a halide group. Dormant halogens can be removed from the terminus of the graft copolymer by any manner known in the art, such as by HX abstraction. Typically the dormant halogen is removed by means of a mild dehalogenation reaction, that typically is performed as a post-reaction after the graft copolymer has been formed, and in the presence of at least an ATRP catalyst. Preferably, the dehalogenation is performed in the presence of both an ATRP catalyst and its associated ligand.

As discussed above, the ATRP process can be conducted with a sequence of monomers to produce a defined copolymer. Thus, the choice of monomers and the sequence of their reaction with dormant halide groups of the initiator and/or propagating chain will influence the final structure of the copolymer. The choice of macroinitiator also will dictate the physical structure of the copolymer. For instance, initiation with certain dormant halides will be more favorable than others. The degree of branching of the macroinitiator also will affect the final structure of the copolymer. Since the dormant halide groups of the macroinitiator are pendant, grafted linear portions of the polyolefin backbone will have a comb-like structure. Macroinitiators with branched structures will yield a more complex, branched copolymer with both comb-like sections, corresponding to relatively linear portions of the backbone, and star-like sections that are the result of grafting onto a tertiary carbon at a branch point between linear portions of the polyolefin backbone. The average weight of the macroinitiator also will dictate the complexity of the resultant copolymer. Lastly, the number of dormant halides on the polyolefin backbone, i.e., the weight percent of active halide groups in the initiator, will effect the structure of the copolymer.

The copolymer prepared according to the methods of the present invention is a copolymer having a polyolefinic backbone and one or more polymer blocks prepared according to the above-described process.

Thus, the copolymer of the present invention includes a polyolefin backbone with pendant halide groups and pendant polymeric blocks of radically polymerizable alkenes containing a polar group that are attached to tertiary carbons of the backbone. The blocks may be of the same monomer, but preferably are of two or more different monomers. The blocks may be homopolymeric or copolymeric. The blocks typically are attached sequentially to the polyolefin backbone, as in general structure (IX):

PO—(A—B—X)$_n$    (IX)

Where PO is the backbone, n is an integer greater than 0, A is a first block of monomers, B is a second block of monomers and X is a dormant halide. The monomer content of each of block A and B differ. By "monomer content" it is meant both the type of monomer, i.e., GMA vs. MMA, and the relative ratio of the monomers, by weight, in each block. It should be noted that in certain circumstances, even though blocks of A are attached directly to the backbone, blocks of B may also be attached directly to the backbone. This can result from the incomplete use of dormant halides on the backbone. In such a case, at least three types of grafts exist, according to the following: —A—X. —A—B—X and —B—X, each of which may exist on the same or different backbone. The relative amount of each of these grafts will depend on the reaction conditions and structure of the initiator, and is dependent upon the relative initiation and propagation contents for the respective dormant halides and monomers chosen under the specific reaction conditions.

In one embodiment of the present invention, the copolymer is used as an additive for a film-forming composition. The additive promotes adhesion of the film-forming composition to a polyolefinic substrate, thereby preventing delamination of the film-forming composition from the substrate.

The copolymer typically is present in the film-forming composition in an amount of at least 1.5% by weight, preferably at least 3% by weight, and more preferably at least 5% by weight, based on the total weight of the resin solids other than the copolymer in the film-forming composition. The copolymer is also typically present in the film-forming composition in an amount of less than 20% by weight, preferably less than 5% by weight, and more preferably less than 3% by weight, based on the total weight of the resin solids in the film-forming composition. The amount of copolymer present in the film-forming composition of the present invention may range between any combination of these values, inclusive of the recited values.

Nevertheless, depending upon the structure of the copolymer, and the active groups present thereon, the copolymer can serve as a primary film-forming resin in a coating. In this particular embodiment, the graft copolymer is typically present in the film forming composition in an amount of about 50% to 100% by weight, preferably 45% to 100% by weight.

A crosslinking agent typically is present in the film-forming composition. Generally, the crosslinking agent is an aminoplast or an isocyanate. An aminoplast crosslinking agent is commonly a partially or fully alkylated aminoplast crosslinking agent. The aminoplast crosslinking agent can have a plurality of functional groups, for example, alkylated methylol groups, that are reactive with the pendant carbamate groups present in the acrylic, polyester, polyurethane or polyether polymer.

Aminoplast resins, which include phenoplasts, as curing agents for hydroxyl, carboxylic acid and carbamate functional group-containing materials are well-known in the art. Aminoplast crosslinking agents are obtained from the reaction of formaldehyde with an amine and/or an amide. Melamine, urea, or benzoguanamine condensates are preferred. However, aminoplast condensates prepared from other amines or amides can be used, for example, aldehyde condensates of glycouril, which are useful in formulating powder coatings. Most often, formaldehyde is used as the aldehyde; however, other aldehydes such as acetaldehyde, crotonaldehyde, and benzaldehyde are also suitable.

By the term "fully alkylated" it is meant that the alkylol groups associated with the reaction product of an aldehyde with an amine and/or an amide have been etherified to an extent that the alkoxy groups make up at least 80% by weight of the functional groups.

A preferred aminoplast crosslinking agent is a melamine-formaldehyde condensate that has been fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, n-butanol, isobutanol, and cyclohexanol. Most preferably, a blend of methanol and n-butanol is used. Suitable aminoplast resins are commercially available from Cytec Industries, Inc. under the trademark CYMEL® and from Solutia, Inc. under the trade name RESIMENE®.

The aminoplast curing agent is typically present in the compositions of the invention in an amount ranging from 2 to 60 wt. %, preferably from 10 to 50 wt. %, and more preferably from 15 to 45 wt. % based on the total weight of resin solids in the composition.

The curing agent may also be a polyisocyanate that optionally can be added as an adjuvant curing agent, along with an aminoplast. As used herein and in the claims, the term "polyisocyanatel" is intended to include blocked (or capped) polyisocyanates as well as unblocked polyisocyanates. The polyisocyanate can be an aliphatic or an aromatic polyisocyanate or a mixture of the two. Diisocyanates may be used, although higher polyisocyanates such as isocyanurates of diisocyanates are preferred. Higher polyisocyanates can also be used in combination with diisocyanates. Isocyanate prepolymers, for example, reaction products of polyisocyanates with polyols, can also be used. Mixtures of polyisocyanate curing agents can be used.

Examples of suitable aliphatic diisocyanates are straight-chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis (cyclohexyl isocyanate). Examples of suitable aromatic diisocyanates are p-phenylene diisocyanate, diphenylmethane-4,4'-diisocyanate and 2,4- or 2,6-toluene diisocyanate. Other diisocyanates include 1,3-bis(1-isocyanato-1-methylethyl)benzene. Examples of suitable higher polyisocyanates are triphenylmethane-4,4',4"-triisocyanate, 1,2,4-benzene triisocyanate and polymethylene polyphenyl isocyanate. Other polyisocyanates include biurets and isocyanurates of diisocyanates, including mixtures thereof, such as the isocyanurate of hexamethylene diisocyanate, the biuret of hexamethylene diisocyanate, and the isocyanurate of isophorone diisocyanate. Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one), can also be used.

If the polyisocyanate is blocked or capped, any suitable aliphatic, cycloaliphatic, or aromatic alkyl monoalcohol known to those skilled in the art can be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol.

Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes, pyrazoles and lactams. One particular example is isophorone diisocyanate capped with methyl ethyl ketoxime.

When used, the polyisocyanate curing agent is present in an amount ranging from 1 to 40 wt. %, preferably from 1 to 20 wt. %, more preferably 1 to 10 wt. % based on the total weight of resin solids in the film-forming composition.

Examples of other blocked polyisocyanates include triazine compounds having the formula $C_3N_3(NHCOXR)_3$, wherein X is nitrogen, oxygen, sulfur, phosphorus, or carbon, and R is an alkyl group having one to twelve, preferably one to four, carbon atoms, or mixtures of such alkyl groups. X is preferably oxygen or carbon, more preferably oxygen. R preferably has one to eight carbon atoms, for example, methyl, ethyl, n-propyl, isopropyl, butyl, n-octyl and 2-ethylhexyl. R is preferably a mixture of methyl and butyl groups. Such compounds, and the preparation thereof, are described in detail throughout U.S. Pat. No. 5,084,541, incorporated herein by reference. Examples of triazine compounds are tris carbamoyl triazine or 1,2,5 triazine-2,4,6 tris-carbamic acid esters. When used, the triazine curing agent is present in the film-forming composition in an amount ranging from 1 to 40 wt. %, preferably from 1 to 20 wt. %, more preferably 1 to 10 wt. % based on the total weight of resin solids in the film-forming composition.

Optionally, a diluent can be present in the film-forming composition, that serves to reduce the viscosity of the coating composition. If the coating composition is solventborne, the diluent typically comprises an organic solvent. Examples of suitable solvents include alcohols such as ethanol, isopropanol, n-butanol, and the like; esters such as n-butyl acetate, n-hexyl acetate, pentyl propionate, and the like; ethers such as the monoethyl, monobutyl and monohexyl ethers of ethylene glycol and propylene glycol, and the like; ketones such as methyl ethyl ketone, methyl isobutyl ketone, diisobutyl ketone, and the like; aromatic hydrocarbons such as xylene, or toluene, and the like; aliphatic or alicyclic hydrocarbons such as the various petroleum naphthas and cyclohexane; and mixtures thereof.

When present, diluents are typically used at a level of up to about 97% by weight based on the total weight of the film-forming composition.

The film-forming composition can also be used in particulate form, i.e., as a powder coating, in which the acrylic polymer and the oligomer or polymer containing the repeating ester groups are chosen such that they have a glass transition temperature (Tg) greater than 60° C. These materials can then be combined with an aldehyde condensate of glycouril, as previously mentioned, to form a powder film-forming composition.

The film-forming composition is typically a thermosetting composition and typically contains catalysts to accelerate the curing reactions. Typically, the catalysts are acidic materials. Sulfonic acids, substituted sulfonic acids and amine neutralized sulfonic acids are preferred, for example, p-toluene sulfonic acid, dodecyl benzene sulfonic acid, dinonylnaphthalene disulfonic acid, and the like. The catalyst is usually present in an amount of from 0.3 to 5.0 percent, preferably from 0.5 to 1.0 percent, the percentages based on the total weight of resin solids in the coating composition.

The film-forming composition can contain other optional ingredients, such as co-reactive resinous materials, plasticizers, anti-oxidants, UV light absorbers, surfactants, flow control agents, anti-settling agents, and the like. When present, these materials are generally used at a level of less than 25%, preferably less than 10% by weight, the percentages based on the total weight of resin solids in the coating composition. The coating composition can also contain pigment.

The film-forming composition containing additive quantities of the copolymer is applied to a polyolefinic substrate directly. However, since the physical characteristics of the copolymer of the present invention can vary broadly, the copolymer may be present in other coating layers or can find use for purposes other than promoting adhesion to a polyolefinic substrate. In that case, the coating can be applied to any of the various substrates to which it adheres. Specific examples of suitable substrates include metals, wood, glass, cloth, plastic, foam, elastomeric substrates, and the like. Typically, the substrate is metal or plastic and, most typically, a polyolefinic plastic. Optionally, the substrate could have been previously coated with an electrocoat primer and/or a primer surfacer and/or a pigmented basecoat and the film-forming composition of the present invention applied as a clear coat over the pigmented base coat to form a color plus clear composite coating.

The compositions can be applied by conventional means including brushing, dipping, flow coating, spraying, and the like. Preferably, they are applied by spraying. The usual spray techniques and equipment for air-spraying or electrostatic spraying can be used.

The copolymers of the present invention find use in many fields, such as in coating compositions, compositions for molding, extruding and other article fabrication processes, healthcare and personal care compositions and in any other application for polymeric compounds.

The present invention is more particularly described in the following examples, which are intended to be illustrative only, since numerous modifications and variations therein will be apparent to those skilled in the art. Unless otherwise specified, all parts and percentages are by weight.

A. SYNTHESIS EXAMPLES

Example 1

Synthesis of Graft Copolymer Chlorinated Polyolefin (CPO)-GMA-MMA

Glycidyl methacrylate (GMA) and methyl methacrylate (MMA) residues were copolymerized using a CPO initiator according to the following:

TABLE A

|  | Ingredients | Parts by weight (grams) |
| --- | --- | --- |
| Charge 1 | Xylene | 588.90 |
|  | Copper | 0.64 |
|  | 2,2'-Bypyridyl | 1.09 |
|  | Magnesol[1] | 20 |
|  | CP343-1 CPO[2] (solid) | 250 |
|  | GMA | 42.60 |
| Charge 2 | MMA | 100 |

[1] A hydrated, synthetic, amorphous form of magnesium silicate, commercially available from The Dallas Group of America, Inc.
[2] A maleic anhydride-modified chlorinated polypropylene having a chloride content of 18% to 23% by weight, commercially available from Eastman Chemical Company.

Charge 1 was heated in a reaction vessel with agitation at 85° C. and the reaction mixture was held at this temperature for 2 hours. The charge 2 was added over a period of 15 minutes. The reaction mixture was held at 85° C. for 3 hours. The reaction mixture was cooled and filtered. The resultant graft copolymer had a total solid content of 41.3% determined at 110° C. for one hour. The copolymer had number average molecular weight, Mn=20,320 and polydispersity Mw/Mn=2.57 (determined by gel permeation chromatography using polystyrene as a standard). The chlorinated polyolefin (CP343-1) macroinitiator had number average molecular weight, Mn=13,950 and polydispersity Mw/Mn=2.20 (determined by gel permeation chromatography using polystyrene as a standard). The $^1$H NMR spectrum is fully consistent with graft-copolymer CPO-GMA-MMA, exhibiting all key absorption of monomers used and the peak arising from macroinitiator. DSC data show for the graft copolymer yielded a melting point of Tm=98° C., and percentage of crystallinity Wc~1%.

Example 2

Synthesis of Graft Copolymer Chlorinated Polyolefin (CPO)-GMA/Neodecanoic Acid-MMA An adduct of GMA and neodecanoic acid (GMA/neodecanoic acid) and MMA residues were copolymerized using a CPO initiator according to the following:

TABLE B

|  | Ingredients | Parts by weight (grams) |
| --- | --- | --- |
| Charge 1 | Xylene | 588.9 |
|  | Copper (II) bromide | 0.11 |
|  | Copper | 0.06 |
|  | 2,2'-Bypyridyl | 0.11 |
|  | Magnesol | 20 |
|  | CP343-1 CPO | 250 |
|  | GMA/Neodecanoic acid[1] | 94.82 |
| Charge 2 | MMA | 100 |

[1] An adduct of GMA/neodecanoic acid.

Charge 1 was heated in a reaction vessel with agitation at 85° C. and the reaction mixture was held at this temperature for 2 hours. The charge 2 was added over a period of 15 minutes. The reaction mixture was held at 85° C. for 3 hours. The reaction mixture was cooled and filtered. The resultant graft copolymer had a total solid content of 44.2% determined at 110° C. for one hour. The copolymer had number average molecular weight, Mn=15,790 and polydispersity Mw/Mn=2.79 (determined by gel permeation chromatography using polystyrene as a standard). The chlorinated polyolefin (CP343-1) macroinitiator had number average molecular weight, Mn=13,950 and polydispersity Mw/Mn=2.20 (determined by gel permeation chromatography using polystyrene as a standard). The $^1$H NMR spectrum is fully consistent with graft-copolymer CPO-GMA/neodecanoic acid-MMA, exhibiting all key absorption of monomers used and the peak arising from macroinitiator. DSC data show for the graft copolymer yielded a melting point of Tm=87° C., and percentage of crystallinity Wc~4%.

Example 3

Synthesis of Graft Copolymer Chlorinated Polyolefin (CPO)-HPMA-MMA-HPMA

Hydroxypropyl methacrylate (HPMA) and MMA residues were copolymerized using a CPO initiator according to the following:

TABLE C

| | Ingredients | Parts by weight (grams) |
|---|---|---|
| Charge 1 | Xylene | 588.9 |
| | Copper (II) bromide | 0.67 |
| | Copper | 0.06 |
| | 2,2'-Bypyridyl | 0.11 |
| | Magnesol | 20 |
| | CP343-1 CPO | 250 |
| | HPMA | 21.60 |
| Charge 2 | MMA | 100 |
| Charge 3 | HPMA | 21.30 |

Charge 1 was heated in a reaction vessel with agitation at 85° C. and the reaction mixture was held at this temperature for 2 hours. The charge 2 was added over a period of 15 minutes. The reaction mixture was held at 85° C. for 3 hours. The charge 3 was added over a period of 15 minutes. The reaction mixture was held at 85° C. for 2 hours. The reaction mixture was cooled and filtered. The resultant graft copolymer had a total solid content of 41.0% determined at 110° C. for one hour. The copolymer had number average molecular weight, Mn=19,640 and polydispersity Mw/Mn=3.0 (determined by gel permeation chromatography using polystyrene as a standard). The chlorinated polyolefin (CP343-1) macroinitiator had number average molecular weight, Mn=15,120 and polydispersity Mw/Mn=2.30 (determined by gel permeation chromatography using polystyrene as a standard). The $^1$H NMR spectrum is fully consistent with graft-copolymer CPO-HPMA-MMA-HPMA, exhibiting all key absorption of monomers used and the peak arising from macroinitiator. DSC data show for the graft copolymer yielded a melting point of Tm=91° C., and percentage of crystallinity Wc~3%.

Example 4

Synthesis of Graft Copolymer Chlorinated Polyolefin (CPO)-HPMA

HPMA residues were polymerized using a CPO initiator according to the following:

TABLE D

| | Ingredients | Parts by weight (grams) |
|---|---|---|
| Charge 1 | Xylene | 1177.80 |
| | Copper (II) bromide | 1.34 |

TABLE D-continued

| | Ingredients | Parts by weight (grams) |
|---|---|---|
| | Copper | 0.34 |
| | 2,2'-Bypyridyl | 0.44 |
| | Magnesol | 40 |
| | CP343-1 CPO | 500 |
| | HPMA | 285.80 |

Charge 1 was heated in a reaction vessel with agitation at 85° C. and the reaction mixture was held at this temperature for 4 hours. The reaction mixture was cooled and filtered. The resultant graft copolymer had a total solid content of 41.3% determined at 110° C. for one hour. The copolymer had number average molecular weight, Mn=20,380 and polydispersity Mw/Mn=3.0 (determined by gel permeation chromatography using polystyrene as a standard). The chlorinated polyolefin (CP343-1) macroinitiator had number average molecular weight, Mn=15,120 and polydispersity Mw/Mn=2.30 (determined by gel permeation chromatography using polystyrene as a standard). The $^1$H NMR spectrum is fully consistent with graft-copolymer CPO-HPMA, exhibiting all key absorption of monomer used and the peak arising from macroinitiator. DSC data show for the graft copolymer yielded a melting point of Tm=87° C., and percentage of crystallinity Wc~2%.

Example 5

Synthesis of Graft Copolymer Chlorinated Polyolefin (CPO)-HPMA-MAA/Cardura E-HPMA HPMA and an adduct of Cardura E and methacrylic acid (MAA/Cardura E) were copolymerized using a CPO initiator according to the following:

TABLE E

| | Ingredients | Parts by weight (grams) |
|---|---|---|
| Charge 1 | Xylene | 422.6 |
| | Cardura E | 100 |
| | Copper | 0.75 |
| | 2,2'-Bypyridyl | 2.5 |
| | CP343-1 CPO | 250 |
| | HPMA | 28.80 |
| Charge 2 | MAA/Cardura E[1] | 135.20 |
| Charge 3 | HPMA | 43.20 |

[1]An adduct of MMA/Cardura E.

Charge 1 was heated in a reaction vessel with agitation at 80° C. and the reaction mixture was held at this temperature for 1 hour. The charge 2 was added over a period of 15 minutes. The reaction mixture was held at 80° C. for 3 hours. The charge 3 was added over a period of 15 minutes. The reaction mixture was held at 85° C. for 3 hours. The reaction mixture was cooled and filtered. The resultant graft copolymer had a total solid content of 46.6% determined at 110° C. for one hour. The copolymer had number average molecular weight, Mn=21,660 and polydispersity Mw/Mn=3.0 (determined by gel permeation chromatography using polystyrene as a standard). The chlorinated polyolefin (CP343-1) macroinitiator had number average molecular weight, Mn=15,120 and polydispersity Mw/Mn=2.30 (determined by gel permeation chromatography using polystyrene as a standard). The $^1$H NMR spectrum is fully consistent with graft-copolymer CPO-HPMA-MAA/Cardura E-HPMA, exhibiting all key absorption of monomers used and the peak arising from macroinitiator.

B. COATING EXAMPLES

Example 6

Use of the Resin of Example 5 in an Adhesion Promoting Coating Layer

The resin of Example 5 was evaluated as a low solids, direct substrate adhesion promoter (Coating A). Adhesion to various substrates was compared to the CPO precursor material (Coating B), and a commercial adhesion promoter (DPX-801, PPG Industries, Inc.) (Coating C).

TABLE F

| Component | Coating A weight (g) | Coating B weight (g) |
|---|---|---|
| Resin of Example 5 | 19.9 | — |
| CP343-1 CPO | — | 12.5 |
| Xylene | 80.1 | 87.5 |
| Total | 100.0 | 100.0 |

Plastic substrates were cleaned and abraded using water, an abrasive detergent (DX101, PPG Industries, Inc.), and an abrasive pad (gray Scotch-Brite™, 3M). After rinsing with water and subsequent drying, the substrates were wiped with two additional solvent-based cleaners (DX330, PPG Industries, Inc., DX103 PPG Industries, Inc.).

Coatings A, B, and C were applied directly to the cleaned plastic substrates (~0.1–0.2 DFT), followed by primer sealer (K36, PPG Industries, Inc.), basecoat (DBC4037, PPG Industries, Inc.), and clearcoat (DCU2042, PPG Industries, Inc., coating layers. Coated substrates were cured at ambient temperature.

Coating adhesion was evaluated using a Crosshatch adhesion test. Using a multi-blade cutter (Paul N. Gardner Company, Inc.), coated panels were scribed twice (at 90°), making sure the blades cut through all coating layers into the substrate. Coating adhesion was measured using Nichiban L-24 tape (four pulls at 90°). Adhesion was rated on a 0–5 scale (5=100% adhesion, 0=0% adhesion). Failure mode was adhesive between the substrate and adhesion promoter, unless otherwise noted in the results.

Adhesion measurements were taken one and seven days after application. Additional samples were aged for seven days, then exposed to elevated temperature and humidity (100° C./100% for four days). Adhesion was evaluated immediately and one day after exposure. Adhesion results are summarized in Table G below. Grafting to the CPO (as in Example 5) does not negatively effect adhesion to the various plastic substrates. Additionally, performance of the resin of Example 5 is similar to the commercial adhesion promoter.

TABLE G

| | Substrate[1] | Adhesion 1 Day (0–5) | Adhesion 7 Day (0–5) | Adhesion 1 Hour after Exposure[2] (0–5) | Adhesion 1 Day after Exposure[2] (0–5) |
|---|---|---|---|---|---|
| Coating A | Bayflex 110-35 | 4 | 4 | 4 | 4 |
| | Sequel 1440 | 4 | 4 | 4 | 4 |
| | Montell CA186 | 4 | 4 | 4 | 4 |
| | TSOP-1 | 4 | 4 | 4 | 4 |
| | Himont SD242 | 5 | 5 | 5 | 4 |
| Coating B | Bayflex 110-35 | 4 | 4 | 4 | 4 |
| | Sequel 1440 | 4 | 4 | 4 | 4 |
| | Montell CA186 | 4 | 4 | 4 | 4 |
| | TSOP-1 | 4 | 4 | 4 | 4 |
| | Himont SD242 | 5 | 4 | 5 | 3 |
| Coating C | Bayflex 110-35 | 4 | 4 | 4 | 4 |
| | Sequel 1440 | 4 | 4 | 4 | 4 |
| | Montell CA186 | 4 | 4 | 4 | 4 |
| | TSOP-1 | 4 | 4 | 4 | 4 |
| | Himont SD242 | 5 | 5 | 5 | 4 |

[1]All panels were purchased from ACT Laboratories, Inc.
[2]100° F./100% humidity, 4 days.

Example 7

Use of the Polymer of Example 5 as an Adhesion-Promoting Ingredient in a Primer-Sealer— Comparison to Commercially Available Adhesion-Promoting Layer The resin of Example 5 was evaluated as an adhesion-promoting ingredient in a primer sealer for plastic substrates (Coating D). Pigmentation was dispersed into the resin of Example 5 by milling.

TABLE H

| Component | Coating D weight (g) |
|---|---|
| Resin of Example 5 | 214.4 |
| Disperbyk-110[1] | 5.5 |
| Talc Pigment | 25.0 |
| TiO$_2$ Pigment | 25.0 |
| Barium Sulfate Pigment | 25.0 |
| Black Tint Paste | 1.0 |
| Toluene | 101.1 |
| Butyl acetate | 103.0 |
| Total | 500.0 |

[1]A wetting and dispersing additive, commercially available from Byk Chemie.

Plastic substrates were cleaned as described in Example 6. Coating D was applied directly to the various plastic substrates, followed by basecoat (DBC4037, PPG Industries, Inc.) and clearcoat (DCU2042, PPG Industries, Inc.) coating layers. Additionally, a commercial system was evaluated. Adhesion promoter (Coating E) (DPX-801, PPG Industries, Inc.) was applied directly to the cleaned substrates, followed by primer sealer (K36, PPG Industries, Inc.), basecoat (DBC4037, PPG Industries, Inc.), and clearcoat (DCU2042, PPG Industries, Inc.) coating layers. Coated substrates were cured at ambient temperature.

Coating adhesion was tested as described in Example 6. The results in Table I indicate that primer sealer prepared from the resin of Example 5 (Coating D) provides similar adhesion to the commercial system (Coating E), without use of a separate adhesion promoter layer.

TABLE I

|  | Substrate[1] | Adhesion 1 Day (0–5) | Adhesion 7 Day (0–5) | Adhesion 1 Hour after Exposure[2] (0–5) | Adhesion 1 Day after Exposure[2] (0–5) |
|---|---|---|---|---|---|
| Coating D | Bayflex 110-35 | 3[3] | 4 | 4 | 4 |
|  | Sequel 1440 | 4 | 4 | 4 | 4 |
|  | Montell CA186 | 4 | 4 | 4 | 4 |
|  | TSOP-1 | 4 | 4 | 4 | 4 |
|  | Himont SD242 | 3[3] | 5 | 4 | 4 |
| Coating E | Bayflex 110-35 | 4 | 4 | 4 | 4 |
|  | Sequel 1440 | 4 | 4 | 4 | 4 |
|  | Montell CA186 | 4 | 4 | 4 | 4 |
|  | TSOP-1 | 4 | 4 | 4 | 4 |
|  | Himont SD242 | 4 | 4 | 4 | 4 |

[1]All panels purchased from ACT Laboratories, Inc.
[2]100° F./100% humidity, 4 days.
[3]Primer sealer/basecoat adhesive failure.

Example 8

Use of the Resin of Example 5 as an Adhesion-Promoting Additive for a Primer-Sealer The resin of Example 5 was evaluated as an adhesion-promoting additive for an existing primer sealer system. Experimental coatings were formulated containing 0, 5, 10 or 20 wt. % CPO based on resin solids.

TABLE J

| Component | Coating F Weight (g) | Coating G weight (g) | Coating H weight (g) | Coating I weight (g) |
|---|---|---|---|---|
| K36 Prima[1] | 99.8 | 99.8 | 99.8 | 99.8 |
| DCU2021[2] | 31.7 | 23.4 | 15.0 | — |
| Resin of Example 5 | — | 19.0 | 38.0 | 72.0 |
| Xylene | — | 30.0 | 25.0 | 35.0 |
| DT870[3] | 27.6 | — | — | — |
| DCX8[4] | 17.9 | 17.9 | 17.9 | 17.9 |
| Total | 177.0 | 190.1 | 195.7 | 224.7 |

[1]K36 Prima (primer), commercially available from PPG Industries, Inc.
[2]DCU2021 (clearcoat), commercially available from PPG Industries, Inc.
[3]DT870 (reducing solvent), commercially available from PPG Industries, Inc.
[4]DCX8 (isocyanate hardener), commercially available from PPG Industries, Inc.

Coatings F–I were applied directly to cleaned plastic substrates (see Example 6), followed by basecoat (DBC4037, PPG Industries, Inc.) and clearcoat (DCU2042, PPG Industries, Inc.) layers. Additionally, a Coating J was prepared, wherein the cleaned substrate was coated with a commercial adhesion promoter (DPX-801, PPG Industries, Inc.), a primer sealer (K36, PPG Industries, Inc.), a basecoat (DBC4037, PPG Industries, Inc.), and a clearcoat (DCU2042, PPG Industries, Inc.). All coated substrates were cured at ambient temperature. The adhesion properties of the coatings are summarized in Table K.

TABLE K

| Coating Example | Substrate[1] | Adhesion 1 Day (0–5) | Adhesion 7 Day (0–5) | Adhesion 1 Hour after Exposure[2] (0–5) | Adhesion 1 Day after Exposure[2] (0–5) |
|---|---|---|---|---|---|
| Coating F | Bayflex 110-35 | 4 | 4 | 3 | 3 |
|  | Sequel 1440 | 0 | 0 | 0 | 0 |
|  | Montell CA186 | 0 | 0 | 0 | 0 |
|  | TSOP-1 | 1 | 0 | 0 | 0 |
|  | Himont SD242 | 0 | 0 | 0 | 0 |
| Coating G | Bayflex 110-35 | 4 | 4 | 3 | 3 |
|  | Sequel 1440 | 3 | 3 | 4 | 2 |
|  | Montell CA186 | 4 | 3 | 4 | 3 |
|  | TSOP-1 | 4 | 3 | 4 | 3 |
|  | Himont SD242 | 4 | 4 | 3 | 0 |
| Coating H | Bayflex 110-35 | 4 | 4 | 3 | 4 |
|  | Sequel 1440 | 4 | 4 | 4 | 3 |
|  | Montell CA186 | 4 | 3 | 4 | 3 |
|  | TSOP-1 | 4 | 4 | 4 | 3 |
|  | Himont SD242 | 4 | 4 | 4 | 4 |
| Coating I | Bayflex 110-35 | 4 | 4 | 3 | 3 |
|  | Sequel 1440 | 4 | 4 | 4 | 2 |
|  | Montell CA186 | 4 | 3 | 3 | 3 |
|  | TSOP-1 | 4 | 4 | 4 | 3 |
|  | Himont SD242 | 4 | 4 | 4 | 3 |
| Coating J | Bayflex 110-35 | 4 | 4 | 3 | 3 |
|  | Sequel 1440 | 4 | 3 | 4 | 3 |
|  | Montell CA186 | 4 | 3 | 4 | 3 |
|  | TSOP-1 | 4 | 3 | 4 | 3 |
|  | Himont SD242 | 4 | 4 | 4 | 3 |

[1]All panels purchased from ACT Laboratories, Inc.
[2]100° F./100% humidity, 4 days.

The data in Table K demonstrate that the copolymer of the present invention is comparable to commercially available adhesion promoters in its adhesion promoting activities.

C. Comparison of ATRP Using a CPO Initiator vs. a Conventional Free Radical Polymerization Process For comparison of the process for the present invention and U.S. Pat. No. 5,955,545, copolymers were prepared according to the process of the present invention (Example 9) and U.S. Pat. No. 5,955,545 (Example 10).

Example 9

Synthesis by ATRP of Graft Copolymer CPO-CHMA/BMA/IBMA/HPMA

Cyclohexyl methacrylate (CHMA), butyl methacrylate (BMA), isobutyl methacrylate (IBMA) and HPMA were copolymerized using a CPO initiator according to the following:

TABLE L

| | Ingredients | Parts by weight (grams) |
| --- | --- | --- |
| Charge 1 | Xylene | 100.00 |
| | Copper | 0.60 |
| | 2,2'-Bypyridyl | 2.00 |
| | Cardura E | 30.00 |
| | CP515-2 CPO[1] | 195.3 |
| | (40% TS in xylene) | |
| | CHMA | 150.00 |
| | BMA | 52.50 |
| | IBMA | 70.00 |
| | HPMA | 285.80 |

[1]A chlorinated polypropylene with 26% to 32% chlorine by weight (not modified with maleic anhydride), commercially available from Eastman Chemical Company.

Charge 1 was heated in a reaction vessel with agitation at 85° C. and the reaction mixture was held at this temperature for seven hours. The reaction mixture was cooled and filtered. The resultant graft copolymer had a total solid content of 61.7% determined at 110° C. for one hour. The copolymer had number average molecular weight, Mn=39735 and polydispersity Mw/Mn=3.0 (determined by gel permeation chromatography using polystyrene as a standard). The chlorinated polyolefin (CP515-2) macroinitiator had number average molecular weight, Mn=19390 and polydispersity Mw/Mn=2.30 (determined by gel permeation chromatography using polystyrene as a standard). The 1H NMR spectrum is fully consistent with graft-copolymer CPO-CHMA/BMA/IBMA/HPMA, exhibiting all key absorption of monomers used and the peak arising from the macroinitiator. DSC data show for graft copolymer a glass transition temperature Tg=24° C. (CP 515-2 had Tg=0.7° C.).

Example 10

Synthesis by Free Radical Polymerization of Copolymer CPO/CHMA/BMA/IBMA/HPMA CHMA, BMA, IBMA and HPMA residues were copolymerized using a halogenated CPO initiator according to the following:

TABLE M

| | Ingredients | Parts by weight (grams) |
| --- | --- | --- |
| Charge 1 | Xylene | 100.00 |
| | CP515-2 CPO | 195.3 |
| | (40% TS in xylene) | |
| Charge 2 | VAZO 64[1] | 1.00 |
| | CHMA | 150.00 |
| | BMA | 52.50 |
| | IBMA | 70.00 |
| | HPMA | 285.80 |
| Charge 3 | VAZO 64 | 1.00 |

[1]Azobisisobutyronitrile, commercially available from E.I. duPont de Nemours and Company.

Charge 1 was heated in a reaction vessel with agitation at 100° C. and to the reaction mixture was added charge 2 over a two hour period. At the end of the feed, the temperature was dropped to 80° C., and than charge 3 was added. The reaction mixture was held for five hours at 80° C. The reaction mixture was cooled and filtered. The resultant graft copolymer had a total solid content of 61.7% determined at 110° C. for one hour. The copolymer had number average molecular weight, Mn=19790 and polydispersity Mw/Mn=2.6 (determined by gel permeation chromatography using polystyrene as a standard). The chlorinated polyolefin (CPS15-2) macroinitiator had number average molecular weight, Mn=19390 and polydispersity Mw/Mn=2.30 (determined by gel permeation chromatography using polystyrene as a standard). The 1H NMR spectrum is fully consistent with copolymer CPO/CHMA/BMA/IBMA/HPMA, exhibiting all key absorption of monomers used and the peak arising from the macroinitiator. DSC data show for graft copolymer a glass transition temperature Tg=37.1° C. (CP 515-2 had Tg=0.70° C.), which differs from the Tg of the resin of Example 9 (24° C.).

Example 11

Comparison of Resin of Examples 9 and 10 to CPO as Adhesion-Promoting Layer

Physical properties of the resins of Examples 9 and 10, as well as the precursor CPO material, were characterized using several test methods. Results, as well as a description of the test methods, are summarized in Table N. Physical properties clearly indicate that the two polymerization methods result in two distinct polymers, with unique chain architectures. Adhesion promoting compositions prepared using resins prepared according to U.S. Pat. No. 5,955,545 (Example 10) were less stable and hazy, indicating incompatibility.

The resins of Examples 9 and 10, as well as the CPO precursor material, were formulated as low solids, direct-to-substrate adhesion promoters (Coatings K–M in Table O). Plastic substrates were prepared as outlined in Example 6. Coatings K–M, as well as a commercial adhesion promoter (Coating N, in Table P) (DPX-801, PPG Industries, Inc.), were applied to the cleaned substrates (~0.1–0.2 mil DFT). Subsequently, substrates were coated with primer sealer (K36, PPG Industries, Inc.), basecoat (DBC 4037, PPG Industries, Inc.), and clearcoat (DCU 2042, PPG Industries, Inc.) coating layers. Coated substrates were cured at ambient temperature.

Coating adhesion was evaluated as described in Example 6. Results are summarized in Table P.

TABLE N

| Resin | Solids (%) | Solid Equiv. Weight[1] | Resin Viscosity[2] (cps) | Mn[3] | Appearance of Resin Solution | Appearance of Solid Film | Stability[6] 39° F./120° F. | Tg[7] (° C.) |
|---|---|---|---|---|---|---|---|---|
| CPO Precursor (Eastman 515-2) | 40 (theory) | NA | 38 | 19390 | Visual: Slightly Cloudy | Visual: Clear UV/Vis. Extinction[5]: 1 | Pass/Pass | −0.7 |
| Resin of Example 9 | 61.8 (synthesis) | 1500 (theory) 1351 (actual) | 63 | 39730 | Visual: Clear Haze[4]: 18.63 | Visual: Clear UV/Vis. Extinction[5]: <1 | Pass/Pass | 24.0 |
| Resin of Example 10 | 68.6 (synthesis) | 1400 (theory) 1441 (actual) | 45 | 19730 | Visual: Cloudy Haze[4]: 58.01 | Visual: Cloudy UV/Vis. Extinction[5]: >30 | Fail (cloudy, two layers)/Fail (two layers) | 37.1 |

[1]Solids equivalent weight (SEW) calculated from measured hydroxyl value (imidazole catalyzed acetylation).
[2]Resins reduced to 25% solids in xylene. Viscosity measured at 72° F. using a Brookfield Viscometer LVT (60 rpm, #2 spindle).
[3]GPC Analysis.
[4]Haze determined using Hunterlab DP-9000 (references ASTM E450/ASTM D1925).
[5]UV/Visible light extinction (Extinction = $-\log_{10}$ 1/Transmittance) measured between 400–700 nm. Value presented in Table is a ratio of the Experimental resin amplitude/Eastman 515-2 amplitude.
[6]Resins reduced to 25% solids in xylene, and exposed to "extreme" temperature ranges (120° F. (1 month) or 39° F. (24 hrs.)). Failure noted if resin separates in multiple layers/phases.
[7]Resins drawn down on glass, flashed, and annealed at 40° C. Tg measured using TA Instruments 2920 MDSC unit (20° C./min heating rate, ~6 mg sample weight).

TABLE O

| Component | Coating K weight (g) | Coating L weight (g) | Coating M Weight (g) |
|---|---|---|---|
| Resin of Example 9 | 16.2 | — | — |
| Resin of Example 10 | — | 14.6 | — |
| 515-2[1] | — | — | 25.0 |
| Xylene | 83.8 | 85.4 | 75.0 |
| Total | 100.0 | 100.0 | 100.0 |

[1]Eastman Chemical

TABLE P

| | Substrate[1] | Adhesion 1 Day (0–5) | Adhesion 7 Day (0–5) | Adhesion 1 Hour after Exposure[2] (0–5) | Adhesion 1 Day after Exposure[2] (0–5) |
|---|---|---|---|---|---|
| K | Bayflex 110-35 | 4 | 4 | 4 | 4 |
|  | Sequel 1440 | 1 | 2 | 4 | 4 |
|  | Montell CA186 | 4 | 4 | 4 | 4 |
|  | TSOP-1 | 3 | 2 | 4 | 4 |
|  | Himont SD242 | 5 | 4 | 5 | 5 |
| L | Bayflex 110-35 | 4 | 4 | 4 | 4 |
|  | Sequel 1440 | 4 | 4 | 4 | 4 |
|  | Montell CA186 | 4 | 4 | 4 | 4 |
|  | TSOP-1 | 4 | 4 | 4 | 4 |
|  | Himont SD242 | 5 | 5 | 5 | 4 |
| M | Bayflex 110-35 | 0[3] | 0[3] | 0[3] | 0[3] |
|  | Sequel 1440 | 0[3] | 0[3] | 0[3] | 0[3] |
|  | Montell CA186 | 0[3] | 0[3] | 0[3] | 0[3] |
|  | TSOP-1 | 0[3] | 0[3] | 0[3] | 0[3] |
|  | Himont SD242 | 0[3] | 0[3] | 0[3] | 0[3] |
| N | Bayflex 110-35 | 4 | 4 | 4 | 4 |
|  | Sequel 1440 | 4 | 4 | 4 | 4 |
|  | Montell CA186 | 4 | 4 | 4 | 4 |
|  | TSOP-1 | 4 | 4 | 4 | 4 |
|  | Himont SD242 | 5 | 4 | 5 | 4 |

[1]All panels purchased from ACT Laboratories, Inc.
[2]100° F./100% humidity, 4 days.
[3]Adhesive failure between adhesion promoter and primer sealer As shown in Table N, there are substantial differences between the copolymers of the present invention and those of U.S. Pat. No. 5,955,545, prepared by free-radical polymerization. Because the free-radical polymerization process results in species that are not grafted to a chlorinated polyolefin backbone, there are substantial stability problems with the prior art composition. The resin solution of the present invention is clear as is a solid film coating prepared from the resin solution, even as compared to the CPO precursor. The prior art composition is hazy in solution and produces a visibly cloudy solid film. This is a clear indicator of the instability of the prior art composition and the relative stability of the copolymer of the present invention when in solution. Table P indicates the suitability of the composition of the present invention, as embodied in Coating K, for use in an adhesion-promoting layer. Although the prior art composition may be an effective adhesion promoter, its long-term stability and, therefore, its commercial usefulness are questionable in view of the data presented in Table N.

The present invention has been described with reference to specific details of particular embodiments thereof. It is not intended that such details be regarded as limitations upon the scope of the invention except insofar as and to the extent that they are included in the accompanying claims.

We claim:

1. A copolymer prepared by polymerizinq one or more radically polymerizable alkenes in the presence of a halogenated polyolefin initiator under controlled radical polymerization conditions, in which the halogenated polyolefin initiator includes one or more halides bound to tertiary carbon atoms.

2. The copolymer of claim 1 in which the halogenated polyolefin initiator comprises about 15% to about 45% by weight halide groups with at least about 80% of the halide groups being tertiary.

3. The copolymer of claim 1 in which the halogenated polyolefin initiator contains at least one radically transferable atom and the controlled radical polymerization is performed in the presence of:

(a) a transition metal-complex; and (b) one or more N-, O-, P-, or S-containing ligands which coordinates in a σ-bond or π-bond to the transition metal, or any C-containing compound which can coordinate in a π-bond to the transition metal.

4. The copolymer of claim 3 in which the transition metal is selected from the group consisting of copper, iron, gold, silver, mercury, palladium, platinum, cobalt, manganese, ruthenium, molybdenum, niobium and zinc.

5. The copolymer of claim 3 in which the ligand is selected from the classes consisting of unsubstituted and substituted pyridines and bipyridines, porphyrins, cryptands, crown ethers, polyamines, glycols and coordinating monomers.

6. The copolymer of claim 1 in which the halogenated polyolefin initiator is selected from the group consisting of a halogenated polyethylene, halogenated polypropylene and a halogenated polybutylene.

7. The copolymer of claim 1 in which the tertiary halide group is selected from the group consisting of chlorine and bromine.

8. The copolymer of claim 1 in which the alkenes are vinyl monomers.

9. The copolymer of claim 8 in which the monomers are (meth)acrylic monomers.

10. The copolymer of claim 8 in which the monomers comprise a reactive group selected from the group consisting of hydroxyl, glycidyl, amine and carboxyl.

11. The copolymer of claim 10 in which the monomers comprise a hydroxyl group.

12. The copolymer of claim 11 in which the hydroxyl groups of the copolymer are post-reacted with one of a low molecular weight alkyl carbamate, isocyanic acid or urea to add pendant carbamate groups to the copolymer.

13. A polymer as claimed in claim 1 which is prepared using one monomer.

14. The copolymer of claim 1 which is prepared using at least two different monomers.

15. The copolymer of claim 1 in which a sequence of different monomers are polymerized to form a copolymer having at least one block copolymer segment.

16. The copolymer of claim 15 in which the block copolymer segment contains homopolymeric blocks of different acrylic monomers.

17. The copolymer of claim 16 in which the acrylic monomers are selected from the class of epoxy group-containing acrylic monomers, carboxyl group-containing acrylic monomers, and hydroxyl group-containing acrylic monomers.

18. The copolymer of claim 1 wherein the number average molecular weight of the copolymer is from 5,000 to 50,000.

19. A method of coating a polyolefinic substrate comprising the steps of:

(a) applying to the polyolefinic substrate a first film-forming composition comprising a copolymer prepared by polymerizing one or more monomers of a radically polymerizable alkene in the presence of a halogenated polyolefin initiator under controlled radical polymerization conditions, in which the halogenated polyolefin initiator includes one or more tertiary halide groups; and (b) coalescing the composition to form a substantially continuous film.

20. The method of claim 19, further comprising a step (c) applying a second film-forming composition to an exposed surface of the coalesced, substantially continuous film.

21. The method of claim 19 in which the second film-forming composition is a pigmented composition.

22. The method of claim 20 in which a clear film-forming composition is applied to an exposed surface of the film layer comprising the second film-forming composition.

23. The method of claim 19 wherein the copolymer is present in the film-forming composition in an amount of at least 1.5% by weight.

24. The method of claim 19 wherein the copolymer is present in the film-forming composition in an amount less than 20% by weight.

25. The method of claim 19 wherein the copolymer is a primary film forming resin in the film-forming composition and is present in the film-forming composition in an amount of from 50 to 100% by weight.

26. A coated article comprising a polyolefinic substrate having a coating layer comprising a polyolefin copolymer prepared by polymerizing one or more radically polymerizable alkenes in the presence of a halogenated polyolefin initiator under controlled radical polymerization conditions, in which the halogenated polyolefin initiator includes one or more tertiary halide groups.

27. The coated article of claim 26 in which the halogenated polyolefin initiator comprises about 15% to about 45% by weight halide groups with at least about 80% of the halide groups being tertiary.

* * * * *